(12) United States Patent
Thomas et al.

(10) Patent No.: US 9,331,767 B1
(45) Date of Patent: May 3, 2016

(54) TRANSLATION OF BASIS FUNCTIONS FOR FEEDBACK IN A WIRELESS NETWORK

(71) Applicant: NOKIA SOLUTIONS AND NETWORKS OY, Espoo (FI)

(72) Inventors: Timothy Thomas, Palatine, IL (US); Frederick Vook, Schaumburg, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/617,235

(22) Filed: Feb. 9, 2015

(51) Int. Cl.
*H04L 27/28* (2006.01)
*H04B 7/06* (2006.01)
*H04B 7/04* (2006.01)

(52) U.S. Cl.
CPC ............ *H04B 7/0634* (2013.01); *H04B 7/0408* (2013.01)

(58) Field of Classification Search
CPC ........................... H04B 7/0634; H04B 7/0408
See application file for complete search history.

(56) References Cited

U.S. PATENT DOCUMENTS

| | | | | |
|---|---|---|---|---|
| 8,526,892 | B2 * | 9/2013 | Zhang | .................. H04B 7/0413 370/334 |
| 2002/0051430 | A1 | 5/2002 | Kasami et al. | |
| 2007/0230373 | A1 * | 10/2007 | Li | ......................... H04B 7/0047 370/267 |
| 2009/0221314 | A1 * | 9/2009 | Hu | ......................... H04W 16/28 455/507 |
| 2014/0314035 | A1 * | 10/2014 | Cariou | .................. H04B 7/0417 370/329 |
| 2015/0237617 | A1 * | 8/2015 | Chen | .................... H04B 7/0617 370/329 |

OTHER PUBLICATIONS

Alamouti, Siavash M., "A Simple Transmit Diversity Technique for Wireless Communications", IEEE Journal on Select Areas in Communications, vol. 16, No. 8, pp. 1451-1458, Oct. 1998.
Vook, Frederick W. et al., "Transmit Diversity Schemes for Broadband Mobile Communication Systems", 7 pages, Sep. 24, 2000.
Berardinelli, Gilberto et al., "Zero-tail DFT-spread-OFDM signals", 6 pages, 2013.

* cited by examiner

*Primary Examiner* — Dac Ha
(74) *Attorney, Agent, or Firm* — Brake Hughes Bellermann LLP

(57) ABSTRACT

An example technique may include transmitting, by a base station to a mobile station, sounding signals via a first set of basis function beams, and receiving, by the base station from the mobile station in response to the transmitting, feedback signals indicating a translated basis-function weighting for one or more basis function beams of the second set of basis function beams, the translated basis-function weighting for one or more basis function beams being based on the first set of basis function beams, wherein the second set of basis function beams is different than the first set of basis function beams.

14 Claims, 7 Drawing Sheets

TRANSLATION OF BASIS FUNCTIONS FOR FEEDBACK IN A WIRELESS NETWORK

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations, which are referred to as enhanced Node Bs (eNBs), provide wireless access within a coverage area or cell. In LTE, mobile devices, or mobile stations are referred to as user equipments (UE). LTE has included a number of improvements or developments.

A global bandwidth shortage facing wireless carriers has motivated the consideration of the underutilized millimeter wave (mmWave) frequency spectrum for future broadband cellular communication networks. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, above 6 GHz. For fifth generation wireless systems (5G), an access architecture for deployment of cellular radio equipment employing mmWave radio spectrum has been proposed.

SUMMARY

According to an example implementation, a method may include transmitting, by a base station to a mobile station, sounding signals via a first set of basis function beams, and receiving, by the base station from the mobile station in response to the transmitting, feedback signals indicating a translated basis-function weighting for one or more basis function beams of the second set of basis function beams, the translated basis-function weighting for one or more basis function beams being based on the first set of basis function beams, wherein the second set of basis function beams is different than the first set of basis function beams.

According to another example implementation, an apparatus may include at least one processor and at least one memory including computer instructions, when executed by the at least one processor, cause the apparatus to: transmit, by a base station to a mobile station, sounding signals via a first set of basis function beams; and receive, by the base station from the mobile station in response to the transmitting, feedback signals indicating a translated basis-function weighting for one or more basis function beams of the second set of basis function beams, the translated basis-function weighting for one or more basis function beams being based on the first set of basis function beams, wherein the second set of basis function beams is different than the first set of basis function beams.

According to another example implementation, a computer program product may include a computer-readable storage medium and storing executable code that, when executed by at least one data processing apparatus, is configured to cause the at least one data processing apparatus to perform a method including: transmitting, by a base station to a mobile station, sounding signals via a first set of basis function beams; and receiving, by the base station from the mobile station in response to the transmitting, feedback signals indicating a translated basis-function weighting for one or more basis function beams of the second set of basis function beams, the translated basis-function weighting for one or more basis function beams being based on the first set of basis function beams, wherein the second set of basis function beams is different than the first set of basis function beams.

According to another example implementation, an apparatus may include means for transmitting, by a base station to a mobile station, sounding signals via a first set of basis function beams, and means for receiving, by the base station from the mobile station in response to the transmitting, feedback signals indicating a translated basis-function weighting for one or more basis function beams of the second set of basis function beams, the translated basis-function weighting for one or more basis function beams being based on the first set of basis function beams, wherein the second set of basis function beams is different than the first set of basis function beams.

According to another example implementation, a method may include receiving, by a mobile station from a base station, sounding signals via a first set of basis function beams, determining, by the mobile station based on the sounding signals, a basis-function weighting ($\gamma_b$) of each of $M_B$ basis function beams of the received first set of basis function beams, determining a translated basis-function weighting for each of $N_B$ basis function beams of a second set of basis function beams based upon the basis-function weighting ($\gamma_b$) of each of the $M_B$ basis function beams of the received first set of basis function beams, wherein the second set of basis function beams is different than the first set of basis function beams, and transmitting, by the mobile station to the base station, feedback signals indicating the translated basis-function weighting for each of the $N_B$ basis function beams of the second set of basis function beams.

According to another example implementation, an apparatus may include at least one processor and at least one memory including computer instructions, when executed by the at least one processor, cause the apparatus to: receive, by a mobile station from a base station, sounding signals via a first set of basis function beams; determine, by the mobile station based on the sounding signals, a basis-function weighting ($\gamma_b$) of each of $M_B$ basis function beams of the received first set of basis function beams; determine a translated basis-function weighting for each of $N_B$ basis function beams of a second set of basis function beams based upon the basis-function weighting of each of the $M_B$ basis function beams of the received first set of basis function beams, wherein the second set of basis function beams is different than the first set of basis function beams; and transmit, by the mobile station to the base station, feedback signals indicating the translated basis-function weighting for each of the $N_B$ basis function beams of the second set of basis function beams.

According to an example implementation, a computer program product may include a computer-readable storage medium and storing executable code that, when executed by at least one data processing apparatus, is configured to cause the at least one data processing apparatus to perform a method including: receiving, by a mobile station from a base station, sounding signals via a first set of basis function beams; determining, by the mobile station based on the sounding signals, a basis-function weighting ($\gamma_b$) of each of $M_B$ basis function beams of the received first set of basis function beams; determining a translated basis-function weighting for each of $N_B$ basis function beams of a second set of basis function beams based upon the basis-function weighting of each of the $M_B$ basis function beams of the received first set of basis function beams, wherein the second set of basis function beams is different than the first set of basis function beams; and transmitting, by the mobile station to the base station, feedback signals indicating the translated basis-function weighting for each of the $N_B$ basis function beams of the second set of basis function beams.

According to another example implementation, an apparatus may include means for receiving, by a mobile station from a base station, sounding signals via a first set of basis function beams, means for determining, by the mobile station based on the sounding signals, a basis-function weighting ($\gamma_b$) of each of $M_B$ basis function beams of the received first set of basis function beams, means for determining a translated basis-function weighting for each of $N_B$ basis function beams of a second set of basis function beams based upon the basis-function weighting ($\gamma_b$) of each of the $M_B$ basis function beams of the received first set of basis function beams, wherein the second set of basis function beams is different than the first set of basis function beams, and means for transmitting, by the mobile station to the base station, feedback signals indicating the translated basis-function weighting for each of the $N_B$ basis function beams of the second set of basis function beams.

The details of one or more examples of implementations are set forth in the accompanying drawings and the description below. Other features will be apparent from the description and drawings, and from the claims.

DETAILED DESCRIPTION

Figure 1:
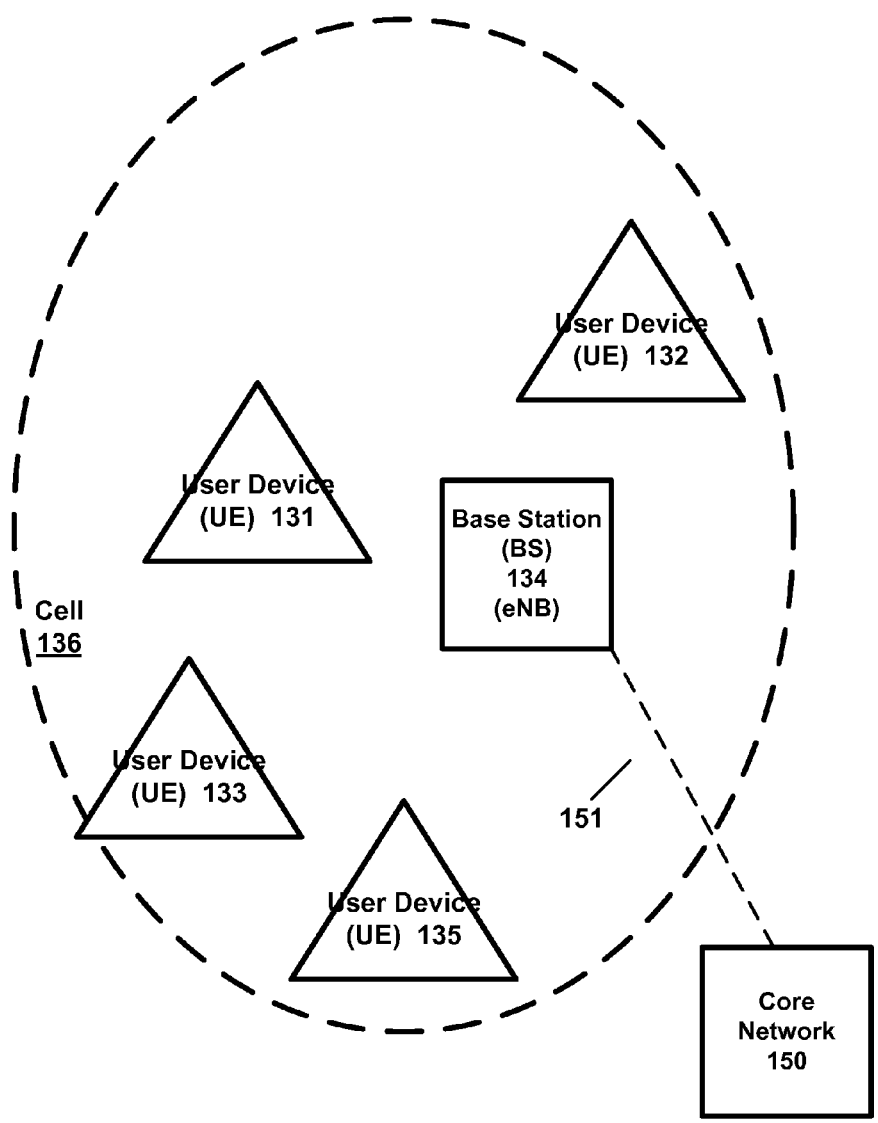
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as user equipments (UEs), may be connected (and in communication) with a base station (BS) 134, which may also be referred to as an enhanced Node B (eNB). At least part of the functionalities of a base station or (e)Node B (eNB) may be also be carried out by any node, server or host which may be operably coupled to a transceiver, such as a remote radio head. BS 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station, a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, and/or mmWave band networks, or any other wireless network. LTE, 5G and mmWave band networks are provided only as illustrative examples, and the various example implementations may be applied to any wireless technology/wireless network.

Figure 2:
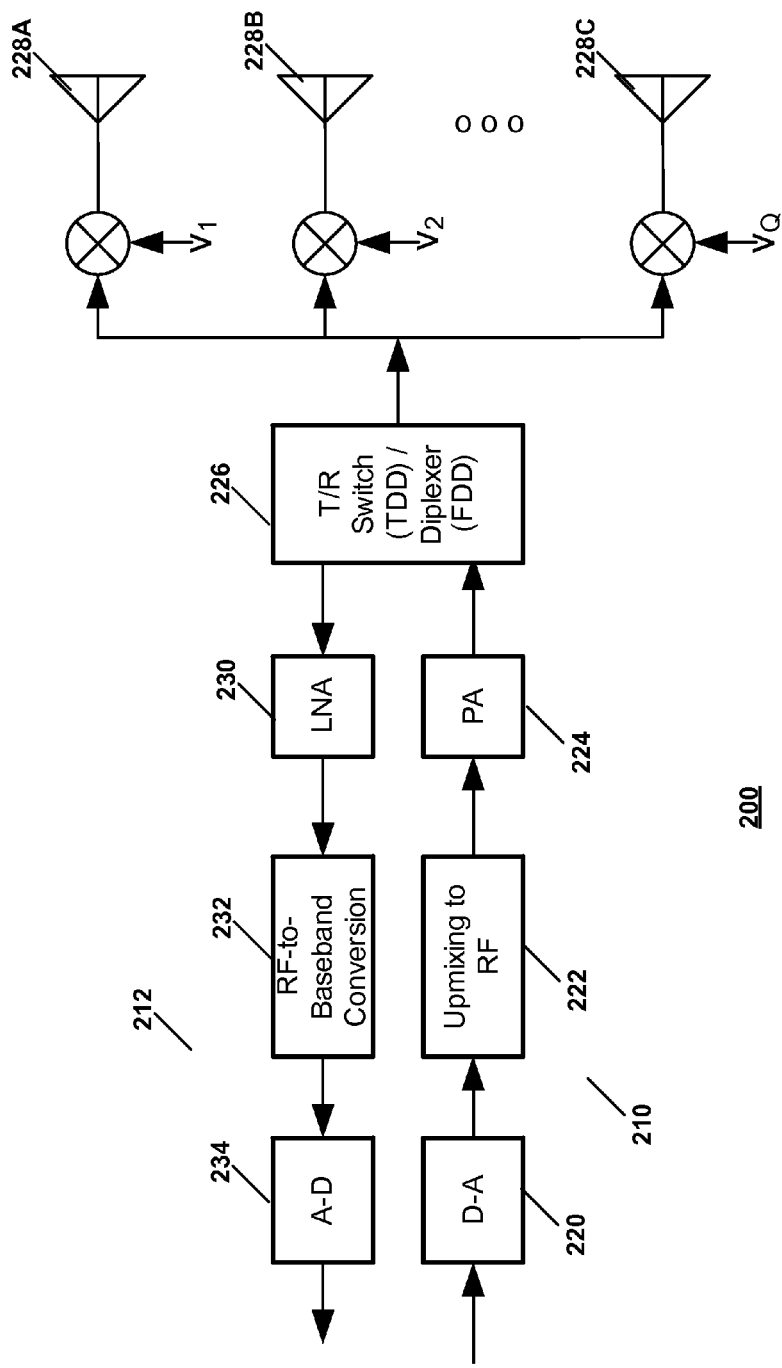
FIG. 2 is a diagram of a wireless transceiver according to an example implementation.

FIG. 2 is a diagram of a wireless transceiver according to an example implementation. Wireless transceiver 200 may be used, for example, at a base station (BS), e.g., Access Point or eNB, or other wireless device. Wireless transceiver 200 may include a transmit path 210 and a receive path 212.

In transmit path 210, a digital-to-analog converter (D-A) 220 may receive a digital signal from one or more applications and convert the digital signal to an analog signal. Upmixing block 222 may up-convert the analog signal to an RF (e.g., radio frequency) signal. Power amplifier (PA) 224 then amplifies the up-converted signal. The amplified signal is then passed through a transmit/receive (T/R) switch (or Diplexer 226 for frequency division duplexing, to change frequencies for transmitting). The signal output from T/R switch 226 is then output to one or more antennas in an array of antennas 228, such as to antenna 228A, 228B and/or 228C. Prior to being transmitted by one or more of the antennas in the array of antennas 228, a set of beam weights $V_1, V_2, \ldots$ or $V_Q$ is mixed with the signal to apply a gain and phase to the signal for transmission. For example, a gain and phase, $V_1, V_2, \ldots$ or $V_Q$, may be applied to the signal output from the T/R switch 226 to scale the signal transmitted by each antenna (e.g., the signal is multiplied by $V_1$ before being transmitted by antenna 1 228A, the signal is multiplied by $V_2$ before being transmitted by antenna 2 228B, and so on), where the phase may be used to steer or point a beam transmitted by the overall antenna array, e.g., for omnidirectional beam steering. Thus, the beam weights $V_1, V_2, \ldots$ or $V_Q$ (e.g., each beam weight including a gain and/or phase) may be a set of transmit beamforming beam weights when applied at or during transmission of a signal to transmit the signal on a specific beam, and may be a set of receive beamforming beam weights when applied to receive a signal on a specific beam.

In receive path 212 of wireless transceiver 200, a signal is received via an array of antennas 228, and is input to T/R switch 226, and then to low noise amplifier (LNA) 230 to amplify the received signal. The amplified signal output by LNA 230 is then input to a RF-to-baseband conversion block 232 where the amplified RF signal is down-converted to baseband. An analog-to-digital (A-D) converter 234 then converts the analog baseband signal output by conversion block 232 to a digital signal for processing by one or more upper layers/application layers.

In some cases, it may be desirable to obtain the full channel knowledge at a radio frequency (RF) millimeter (mmWave) beamforming transmitter. One challenge or difficulty with employing baseband array processing at mmWave is that the analog to digital (A-D) converters and digital to analog (D-A) converters consume an unacceptable amount of power because of the large bandwidths of mmWave systems (e.g., bandwidths of 1-2 GHz as opposed to 20 MHz for traditional cellular frequencies).

The relatively large power consumption of the D-A and A-D converters means that the number of A-D and D-A converters should, at least in some cases, be decreased or minimized in mmWave and, as a result, traditional array processing at baseband may not be viable, or may at least be less viable.

Hence it may not be practical to provide a full baseband transceiver behind each antenna as required by traditional array processing at baseband, so instead a single or a small number of baseband paths may be available for beamforming to an RF beamforming array as illustrated in FIG. 2 (for a single baseband path for all Q elements). In particular, FIG. 2, as an example, illustrates RF beamforming with a single RF beamformer and a single baseband path (one baseband unit for Q total antennas). Other configurations may be provided as well.

One example goal of channel estimation may be to obtain the gain and phase of the channel between each transmit (Tx) antenna element and each receive (Rx) antenna element. With a separate baseband path behind each element, the full channel between a transmitter and a receiver can be obtained. According to an example implementation, this problem may be solved in traditional cellular systems, such as long term evolution (LTE), by sending pilots from each Tx (transmit) antenna separately, receiving them all at the same time on each Rx (receive) antenna, and then using a channel estimator to obtain the full channel. Complicating matters at mmWave is that the receiver will be receiving any pilot transmission from the transmitter with a RF receiver beamformer. The result is that even if a single transmit antenna is sounded, the received signal will not be to a single receive antenna but an aggregated signal from multiple receive antennas. The approach of sounding each Tx antenna separately and listening on each Rx antenna separately may not necessarily be practical, at least in some cases, since there will be no beamforming gain to overcome the path loss so a very long sounding period may be needed to overcome the path loss (i.e., the use of very long spreading codes).

The following description will use, by way of illustrative example, the Tx (transmit or transmitter) and Rx (receive or receiver) having the configuration shown in FIG. 2 with a single Tx and Rx RF beam weight vector, but this is merely one illustrative simple example, and other configurations may be used. It will be assumed that the Tx array is (or may be) an M×M array ($M^2$ total antennas) and the Rx array is an N×N array ($N^2$ total antennas) where both arrays have uniform spacing of antennas in each dimension (e.g., 0.5 wavelength spacing), for example. However, embodiments are not limited to this configuration and this concept can easily be applied to one-dimensional arrays, rectangular arrays of size $M_h \times M_v$ for the Tx and $N_h \times N_v$ for the Rx, circular arrays, and any other arbitrary array.

One illustrative example implementation may include sending sounding waveforms (e.g., a base station sending a pilot sequence) using $Q=M^2$ orthogonal transmit basis functions (where a basis function can be viewed as a transmit beam weight vector or transmit beam), and then the receiver (e.g., a mobile station) sending feedback for the dominant (the basis function beams having the highest amplitude) $M_B$ basis functions. The feedback may then be used to determine the actual channel between each transmit antenna and the best beam at the receiver as described below. Note, however, in general that $B_f$ transmit basis functions can be used instead of $Q=M^2$ transmit basis functions. For example, if the deployment scenario is such that no receiver will ever be located at certain azimuth and/or elevation angles relative to the Tx array, then $B_f < Q$ basis functions may be used which will reduce system overhead by reducing the number of basis functions which need to be sounded.

Therefore, as noted, basis function beams may be useful in obtaining feedback which provides a transmitter with full channel information (i.e., the channel between each transmit antenna and each receive antenna) when the transmitter is employing RF beamforming. However, according to an example implementation, it may be advantageous for a base station to transmit sounding signals (e.g., a pilot sequence) via a first set of basis function beams, and the receiving mobile station to send feedback signals via a second set of basis function beams that are different than the first set of basis function beams. In order to provide/transmit feedback via a different set of basis function beams, the mobile station may, for example, translate a gain and phase measured by the receiver/mobile station of the received beams of the first set of basis function beams to a translated gain and phase of the second set of basis function beams. The translated gain and phase values for the second set of basis functions may then be transmitted as feedback signals from the mobile station to the base station, such as: 1) by sending the translated gain and phase values via one or more beams of the second set of basis function beams (such as by applying the translated gain and phase value for the second set of basis function beams to a signal being transmitted when the base station is listening with the respective beam of the second set of basis function beams), or 2) by sending the translated gain and phase values of the second set of basis function beams to the base station via a separate feedback channel or signal which may not include or involve the second set of basis function beams.

Therefore, according to various example implementations, techniques are described for translating gain and phase information determined for one set of basis function beams to gain and phase values for a different set of basis function beams. For example the access point may sound the channel using narrow-beam basis function beams and the mobile station may then translate the gain and phase values for the narrow-beam basis function beams for use when the base is listening on near-omni-directional basis function beams (for example in the case of random access channel (RACH) reception at the access point). Thus, in such an example, the mobile station may translate gain and phase values for a first set of narrow-beam basis function beams to a set of gain a phase values for an omni (or near-omni) directional beam basis function beams to be used to transmit a RACH preamble to the access point. According to an example implementation, techniques are described that include a mobile station or user device receiving sounding signals (or other signals) from a base station/access point via a first set of basis function beams, and then the mobile station sending feedback signals (e.g., basis-function weights/weightings) via a second (different than the first) set of basis function beams. The mobile station may also perform a translation between gain and phase values (e.g., basis-function weights/weightings) of the first set of basis function beams, and gain and phase values of the second set of basis function beams.

Thus, an example implementation may include transmitting, by a base station to a mobile station, sounding signals via a first set of basis function beams, and receiving, by the base station from the mobile station in response to the transmitting, feedback signals indicating a translated basis-function weighting for each basis function beam of the second set of basis function beams, the translated basis-function weighting for each basis function beam being based on the first set of basis function beams, wherein the second set of basis function beams is different than the first set of basis function beams.

According to an example implementation, the receiving the feedback signals may include: receiving an indication of $N_B$ beams of the second set of basis function beams; and receiving on the $N_B$ beams of the second set of basis function beams feedback signals which the mobile station has applied a translated basis-function weighting including a gain and phase value corresponding to each of the respective $N_B$ beams of the second set of basis function beams which the base station is receiving on, the translated basis-function weightings for the beams of the second set of basis function beams being a function of the first set of basis function beams.

According to another example implementation, a method may include receiving, by a mobile station from a base station, sounding signals via a first set of basis function beams, determining, by the mobile station based on the sounding signals, a basis-function weighting ($\gamma_b$) of each of $M_B$ basis function beams of the received first set of basis function beams, determining a translated basis-function weighting for each of $N_B$ basis function beams of a second set of basis function beams based upon the basis-function weighting ($\gamma_b$) of each of the $M_B$ basis function beams of the received first set of basis function beams, wherein the second set of basis function beams is different than the first set of basis function beams, and transmitting, by the mobile station to the base station, feedback signals indicating the translated basis-function weighting for each of the $N_B$ basis function beams of the second set of basis function beams.

According to an example implementation of the method of the mobile station, the determining a translated basis-function weighting for each of $N_B$ basis function beams of a second set of basis function beams may include: determining beam weightings ($v_b^1$) applied to antennas at the base station to transmit the sounding signals via the first set of basis function beams; determining a channel estimate ($w_{opt}$) between the base station and the mobile station based on the beam weightings ($v_b^1$) applied to antennas at the base station to transmit the sounding signals via the first set of basis function beams and the determined basis-function weightings ($\gamma_b$) of the $M_B$ basis function beams of the received first set of basis function beams; determining beam weightings ($v_b^2$) for the beams of the second set of basis function beams; and determining a translated basis-function weighting ($\alpha_b$) for each of $N_B$ basis function beams of a second set of basis function beams based on the beam weightings ($v_b^2$) for the beams of the second set of basis function beams and the channel estimate ($w_{opt}$) between the base station and the mobile station.

The various example implementations may include techniques for translating the basis-function weights/weightings (e.g., gain and phase values), determined for a received first set of basis function beams to basis-function weights/weightings (e.g., gain and phase values) for a second set of basis function beams. One such use case may be for the uplink RACH channel in a mmWave communication system. Thus, according to an example implementation, there are advantages in a base station/access point receiving a RACH (random access channel) preamble from a mobile station using omni-directional (or near-omni-directional) basis function beams. However, if sounding signals (e.g., pilot sequences) are sent from the base station to the mobile station with near-omni-directional basis function beams, no beamforming gain will be obtained at the mobile station, meaning that longer pilot sequences may typically be needed, as compared to transmitting sounding signals using narrow-beam basis function beams.

Note that, according to an example implementation, a near omni-directional signal may include a radiated signal that is within 7 dB of a radiated omni-directional signal. In another example implementation, a near omni-directional signal may include a radiated signal that is within 3 dB of a radiated omni-directional signal.

Thus, according to an example implementation, the base station may sound (or send sounding signals) with one set of basis function beams and then the mobile station may select a second set (different from the first set) of basis function beams to use for sending feedback to the base station. In different example implementations, the second set of basis function beams could be selected to either minimize the amount of feedback or to optimize performance. An indication of the selected second set of basis function beams may be sent to the base station. Thus, in one illustrative example implementation, sounding signals may be sent from a base station to a mobile station via a narrow-beam set of basis function beams, and the mobile station may send feedback (such as a RACH preamble) to the base station via an omni/near-omni directional set of basis function beams. The feedback signals may indicate a translated basis-function weight/weighting for one or more beams of the second set of basis function beams, e.g., by applying the translated basis-function weights/weightings at different times to the signal sent when the base station listens/receives with the second set of basis function beams. In this case there may be a one-to-one correspondence to the translated basis-function weight/weighting applied to the signal and the basis function beam from the second set of basis function beams in which the base station is listening/receiving with (i.e., a particular basis-function weight/weighting is used which was calculated for the particular basis function beam which the base is using to receive the signal sent from the mobile station).

The feedback, including the set of translated basis-function weights/weightings for the second set of basis function beams, may be sent from the mobile station to the base station via any number of feedback signals or feedback mechanisms from the mobile station to the base station. And, in one example implementation, the feedback, including the translated basis-function weights/weightings for the second set of basis functions, may be signaled or transmitted via a transmission when the base station is listening/receiving with one or more beams of the second set of basis function beams where the translated basis-function weights are applied to the transmission by the mobile station when the base station is listening (or receiving signals) on a corresponding beam from the second set of basis function beams.

According to example implementations, two types of basis function beams are considered as examples. The first is directional or highly-directional beams (or narrow-beams) where it may be likely that the mobile station would only detect a few dominant basis function beams (i.e., $M_B$, the number of dominant basis function beams, is small), where non-dominant beams may have a zero or near-zero amplitude. A dominant basis function beam may be a beam having an amplitude/power greater than a threshold value (e.g., all beams which are received within 10 dB of the strongest beam), and there are $M_B$ dominant basis function beams, where $M_B$ may vary. A second option is using near-omni-directional basis function beams where the mobile station may determine or measure that each beam as being approximately equally good or having a similar amplitude/power, for example.

For example, for a two dimensional array with M antennas in each dimension, basis functions may first be chosen for each dimension (i.e., azimuth or elevation), and then the set of overall basis functions may be formed as the Kronecker combination of the basis functions for the azimuth and elevation dimensions. For example, the basis functions in one dimension (i.e., azimuth or elevation) can be chosen from a sampling of the DFT matrix V whose $(n,m)^{th}$ element is given by:

$$V_{nm}(M) = \exp\left\{-j\frac{2\pi}{M}(n-1)(m-1)\right\} \quad \text{(Eqn. 1)}$$

where $1 \le n \le M$ and $1 \le m \le M$. Referring again to FIG. 2 (with Q in the figure equal to $M^2$), the transmit or receive beam weights ($v_1$ through $V_Q$) for one of the basis function beams would then be the Kronecker product of two of the columns of V (one column for elevation and one column for azimuth). In equation form let $z_n$ refer to column n of V:

$$z_n = \begin{bmatrix} V_{1n} \\ \vdots \\ V_{Mn} \end{bmatrix} \quad \text{(Eqn. 2)}$$

then the set of $M^2$ basis functions or transmit weight vectors (where each weight vector is $M^2 \times 1$) may be defined by ($1 \le n \le M$ and $1 \le m \le M$):

$$v_{n+M(m-1)} = \begin{bmatrix} V_{1m}z_n \\ V_{2m}z_n \\ \vdots \\ V_{Mn}z_n \end{bmatrix} \quad \text{(Eqn. 3)}$$

Eqn. 3 describes an example of a Kronecker product of two of the columns of V. Note that these basis function beams can be referred to as having a DFT matrix structure since they are generated from the columns of V. More particularly, since these basis function beams are the Kronecker product of columns of V, they can be referred to as having a 2D DFT matrix structure. Also these basis function beams can be thought of as $Q \times 1$ transmit beams derived from a discrete Fourier transform (DFT) matrix. If all M columns of V are used as described above then the basis functions created will be orthogonal. However, not all columns may be used in some embodiments. For example, the range of elevation or azimuth angles that an array needs to operate over may be limited. In this case, not all M columns of V may be used to create the basis functions in one or both of the dimensions (azimuth or elevation).

According to an example implementation, a Tx (transmit) beam may include a set of weights, which may be contained in a weight vector, where a different weight from the set is applied to a same signal to be sent from one or more antennas in an array of antennas in order to transmit the signal via a beam. In other words, the weights (or beam weights) are applied to a signal sent from the antenna(s) in the array to radiate the signal with the transmit beam corresponding to the weight vector. A Rx beam may include a set of weights, which may be contained in a weight vector, which will be applied to signals received on antenna(s) in an array of antennas to receive a signal via a beam(s) or via a set of basis function beams. One of these weight vectors in the set of beam weights is given by $V_1$ through $V_Q$ of FIG. 2.

The following steps may be used to determine feedback for providing full channel information when using these or any basis function beams. For each Tx (transmit) weight vector in this set of basis function beams, the base station transmits the reference signal or sounding signal (e.g., pilot sequence) over the resulting basis function beam. Assuming the receiver has already chosen its best Rx (receive) beam, the receiver may then determine the best $M_B$ Tx (transmit) beams to send feedback for (e.g., choose the $M_B$ basis function beams received with the highest power for a fixed $M_B$ or choose the $M_B$ beams received within 10 dB of the strongest received basis function beam). For each of the $M_B$ Tx beams, the receiver (e.g., mobile station) may determine a gain and phase value from the sounding waveform for that Tx beam. The receiver/mobile station may then feed back to the base station an indication of the $M_B$ best Tx beams along with their corresponding gain and phase values. The gain and phase may be quantized in some standard fashion (e.g., uniform sampling of the phase and uniform sampling of the gain between zero and one where the gain is normalized to the strongest beam). The transmitter/base station may determine the $M^2 \times 1$ channel from its transmit antennas to the Rx (receive) beam from the mobile station (including the feedback), as follows:

$$h = \sum_{i=1}^{M_B} \alpha_i v_{f_i} \quad \text{(Eqn. 4)}$$

where $\alpha_n$ is the gain and phase of the $n^{th}$ fed-back beam and $f_n$ is the index of the $n^{th}$ fed-back beam. For each transmit orthogonal basis function beam, the receiver may loop through all of its receive orthogonal basis function beams to determine which is the best receive weight as a weighted sum of the receive weights. Once the receiver determines its receive weight (weights for the receive beams) it may determine the $M_B$ strongest transmit beams and then may compute the gain and phase of each of the $M_B$ strongest transmit beams. Then the receiver may send feedback to the transmitter where the feedback may include indices of the $M_B$ strongest transmitter (or Tx) beams plus their corresponding gain and phase values. Note that $M_B$ may be predetermined (e.g., $M_B=8$) or may be chosen at each feedback interval by the receiver (e.g., the $M_B$ Tx beams which have a power within some threshold, e.g., 10 dB, of the strongest beam).

So, for providing full channel information for transmit beamforming from the base station/access point, the above feedback (e.g., indication of the $M_B$ dominant beams, and gain and phase values of each received beam) may be sufficient, or may be used. However, in some cases, it may be desirable or advantageous for a base station to sound on a first set of basis function beams, and the mobile station to send feedback for a second set of basis function beams that are different than the first set of basis function beams. For example, the mobile station may, for example, send feedback indicating a best $N_B$ beams of a second set of basis function beams, and a basis-function weight (or gain and phase value) for each of the $N_B$ beams.

So for providing full channel information for transmit beamforming from the base station, the above feedback (gain and phase and number or indices of dominant beams) may be sufficient. However for the RACH channel, it may be advantageous for the base station to listen on basis function beams which are near-omni-directional but send sounding on a set of highly-directional basis function beams. For sending sounding it is advantageous to use highly directional basis function beams since a beamforming gain is obtained for the strongest beams received at the mobile station and the weaker beams are not important for the mobile station. The high beamforming gain means that a shorter training period (i.e., shorter training sequence) can be used for the highly-directional beam since the correlation gain of long training sequences (e.g., the one needed for near-omni-directional beams) is unnecessary given the high beamforming gain. However when receiving (e.g., by a base station) a coherent signal sent multiple times from a mobile station such as in the case of a RACH (random access channel) preamble, at least in some cases, it is advantageous to receive it on near-omni-directional basis function beams since the base station/access point must or will typically sum all transmitted RACH signals to obtain a full coherent gain. When using omni-directional-beams, each of the coherent RACH preamble transmissions are received with near-equal SNR (signal to noise ratio). In contrast when listening with highly-directional beams, the SNR quality of each received RACH preamble varies significantly from receive beam to receive beam and hence mobile station transmit power is wasted when the base station listens/receives with a highly directional beam pointed away from the mobile station. Hence in the near-omni directional case the base station can sum all of the coherent RACH preambles together to get a large gain above noise whereas in the highly-directional case the base will add up mostly noise for those times when it listens/receives with a beam pointed away from the mobile. Hence to combine the received RACH preamble transmission from the mobile station with the optimal SNR, it may be considered better or even best for a base station to listen/receive with a set of near-omni-directional basis function beams, e.g., where the mobile station transmits in a coherent fashion with gain and phase values calculated for the near-omni-directional basis function which the base station listens with. This coherent transmission of the RACH preambles will be described later.

In cases where omni-directional coverage with the basis function beams is desired, near-omni-directional basis function beams may be constructed or generated. To construct an example near-omni-directional basis function beams, first a near-omni-directional beam may be created for one dimension (either azimuth or elevation). The construction can be done in any known way like by a gradient search which minimizes the peaks while maximizing the minimums of the antenna pattern while forcing the elements of the weight vector to be constant modulus. The constant modulus property is very useful in RF (radio frequency) beamforming so that full energy is received on all receive antennas instead of attenuated power on some receive antennas which will result in increase in noise and a degradation of the SNR (signal to noise ratio) after receive combining of signals at RF. Through the gradient search two example single-dimension near-omni directional beams are given by:

$$f = \frac{1}{2}\begin{bmatrix} 1 \\ \exp(-j1.9433) \\ \exp(-j0.7348) \\ \exp(j0.4568) \end{bmatrix} \text{ and} \quad \text{(Eqn. 7)}$$

$$f = \frac{1}{\sqrt{8}}\begin{bmatrix} 1 \\ \exp(-j0.175) \\ \exp(j1.5892) \\ \exp(j1.82) \\ \exp(j0.6156) \\ \exp(-j0.6306) \\ \exp(j2.102) \\ \exp(-j1.3168) \end{bmatrix} \text{ for } M = 4 \text{ and } M = 8.$$

respectively.

Thus, with reference to the 4-antenna example in the Eqn. 7, a weight would be applied to each antenna of: amplitude/gain=½, and a different phase as shown, to result in radiating an omni-directional (or near omni-directional) beam, either as a Tx beam to transmit a signal, or a Rx beam to receive a signal.

Note that for near-omni directional beams, the deviation between the maximum gain and minimum gain is very (or relatively) small compared to the highly-directional beams. To obtain a near-omni-directional beam for the M×M array, a Kronecker product of the two beams can be used. It should be noted that to obtain the beams for the M×M array that the Kronecker product may be performed using, for example, the above weight, f, and another weight which may be f shifted by 30 degrees (i.e., f is element-wise multiplied by an array manifold vector for 30 degrees). To get a full set of near-omni-directional basis function beams, the resulting near-omni-directional beam obtained for the M×M array may be element-wise multiplied by the set of highly-directional basis function beams obtained above. Basically, according to one illustrative example implementation, the element-wise multiplication with the highly-directional beams shifts the near-omni-directional pattern in the direction of the maximal gain of the highly-directional beams while retaining the near-omni-directional pattern.

To translate the gain and phases found on one set of basis function beams to a gain and phase for a second set of basis function beams, a mobile station may typically need to know the basis function beams used in both sets. This limitation is in contrast to the case where only a single set of basis function beams are used. When only a single set of basis function beams is used, the mobile station just needs to know 1) the number of basis function beams, and 2) when the pilot sequences/sounding signals are sent on each basis function beam. According to an example implementation, to translate the gain and phase values (basis-function weightings) between basis function sets, first the mobile station will determine a gain and phase value (a basis-function weighting) for each of the $M_B$ dominant basis function beams for the first set by receiving pilot sequences sent on each of the beams in a first set of basis function beams. According to an example implementation, for the translation of gain and phase values, both a gain and phase should be determined, not just a phase. Then the mobile station may determine the channel estimate for the channel between the base station and mobile station. This channel estimate may be determined as a sum of products of $\gamma_b$ (measured basis-function weightings, or gain/phase values, measured at mobile station for basis function beam b, set 1) and $v_b^1$ (beam weightings, or gain/phase values, applied by transmitter base station to each antenna in the array for beam b, set 1).

The channel estimate may also be referred to as the optimal Tx (transmit) beamforming vector $W_{opt}$ (optimal for the base station to use when transmitting to the mobile station) as:

$$w_{opt} = \sum_{b=1}^{M_B} \gamma_b v_b^1, \quad \text{(Eqn. 8)}$$

($W_{opt}$ is also known as the channel estimate for the channel between the base station and the mobile station since the optimal beamformer will transmit in the direction of the channel estimate between the base station and the mobile station).

With respect to the channel estimate (or optimal Tx (transmit) beamforming vector $W_{opt}$) of Eqn. 8, $v_b^1$ is basis function beam b from basis function set 1 ($v_b^1$ are the beam weightings or the beam weights, e.g., gain and phase values, applied at the transmitter/base station, such as example beam weightings/weights $V_1 \ldots V_Q$ applied to antennas shown in FIG. 2 to generate beam b of the set 1 of basis function beams), $\gamma_b$ is the basis-function weighting, or gain and phase value, determined/measured at the receiver for basis function beam b from set 1 (e.g., the gain and phase values as measured by receiver/mobile station for the basis function beam b, of set 1), and $M_B$ is the number of dominant basis function beams from set 1 ($M_B$ could be set to $M^2$ in an example, e.g., such as for a best performance).

Note that for the highly directional beams that many of the $\gamma_b$ values (measured basis-function weightings, or measured gain phase values, as measured by the mobile station for the beam b) may typically be zero and hence $M_B$ could be low (e.g., only 2 or 3 dominant beams). Then, the gain and phase values for basis function beam b from set 2, which are the translated basis-function weightings, may, for example, be determined as:

$$\alpha_b = (v_b^2)^H w_{opt} \quad \text{(Eqn. 9)},$$

where $v_b^2$ is basis function beam b (or beam weightings for beam b of the second set, or set 2, of basis function beams), and where H refers to Hermitian operator (performed on $v_b^2$), including transposing and conjugating of $v_b^2$. Where $\alpha_b$ or $\alpha_b^*$ may be considered the translated basis-function weightings/weights.

A complex conjugation may be performed on $\alpha_b$ to obtain $\alpha_b^*$:

where $\alpha_b^*$ is the conjugate of the translated basis-function weighting/weight (including gain and phase) for beam b for the second set (or set 2) of basis function beams. Therefore, according to an example implementation, the translated basis-function weightings/weights $\alpha_b$ for $N_B$ basis function beams of the second set (or set 2) of the basis function beams may be determined based on the channel estimate ($W_{opt}$) and the beam weightings $v_b^2$ of beam b of the set 2 of the basis function beams. Therefore, Eqns. 8 and 9 describe one illustrative example technique that may be used to translate the measured basis-function weightings $\gamma_b$ (e.g., including gain and phase values) determined/measured at the receiver/mobile station based on the received first set (or set 1) of the basis function beams to the translated basis-function weightings/weights $\alpha_b$ for $N_B$ basis-function beams of the second set (or set 2) of the basis function beams. If the $N_B$ basis-function beam weights of the second set are fed-back to the base station via some feedback channel, then the base station may determine the channel estimate ($W_{opt}$) as $$w_{opt} = \sum_{b=1}^{N_B} \alpha_b v_b^2$$

These translated basis-function weightings/weights (e.g., translated gain and phase values) $\alpha_b$ may, for example, be used for RACH preamble transmission via transmission over time intervals when the base station listens with one or more beams of the second set of basis function beams, or these translated weightings (e.g., including gain and phase values) $\alpha_b^*$ or simply $\alpha_b$ may be fed back to the base station via a different or separate feedback signal (e.g., that does not use the second set of basis function beams, but merely communicates the translated weightings). Thus, this feedback (translated basis-function weightings, or translated gain and phase values $\alpha_b$ or $\alpha_b^*$ for the second set of basis function beams) may be indicated or provided as gain and phase values applied to a signal (e.g., a RACH preamble) sent from the mobile station when the base station is listening on one or more transmitted beams of the second set of basis function beams, or the translated basis-function weightings or translated gain and phase values $\alpha_b$ or $\alpha_b^*$ may be sent/transmitted by the mobile station to the base station as one or more values sent to base station via a different feedback channel, signaling channel, etc. Thus, the feedback from the mobile station relating to the second set of basis functions may be sent either 1) via the second set of basis functions (i.e., when the base station is listening on the second set of basis function beams), or 2) may be sent via a channel or signal that does not use basis function beams/does not receive signals via the second set of basis function beams, but rather sends this feedback via a different feedback channel or mechanism. The feedback may, for example, indicate or identify the beam(s) of the second set of basis function beams and the basis-function weightings/weights (e.g., gain and phase values) for each beam of the second set of beams. The feedback may, in addition, indicate the number of basis function beams, $N_B$, which basis-function weights are fed back for.

This example implementation may be performed according to the following: 1) The base station sends training signals or sounding signals (pilot sequences) from or via each of the basis function beams. This training could be part of another message such as broadcast control (BCH) or the synchronization channel. 2) The mobile station receives the training signals or sounding signals from each of the basis function beams and determines a phase (or a gain and phase), $\alpha_b$, for the dominant (e.g., strongest) $M_B$ beams. Note that $\alpha_b$, which is also called the basis-function weighting, is only non-zero for the dominant $M_B$ beams and is zero for the remaining $M^2-M_B$ beams. 3) The mobile station transmits multiple successive copies of the RACH preamble, each phased (i.e., multiplied) by the respective value, $\alpha_b^*$, during the time that the base station/access point is listening on the respective dominant $M_B$ beams. The mobile station may transmit the RACH preamble multiplied by the complex conjugate of $\alpha_b$, which is $\alpha_b^*$ when the base station is listening on beam b (e.g., when the base station has applied beam weightings on antennas to receive that beam). 4) The base station/access point sums the signal received when it is listening on each of the basis function beams to create a single aggregated RACH signal. 5) And, the base station/access point detects the presence of a RACH preamble from the aggregated RACH signal.

Some complications or issues may arise, at least in some cases, such as: 1) The mobile station has a maximum transmit power and in mmWave with high bandwidths the mobile station may typically (for example) be transmitting a RACH preamble at full power. This means that power may typically be lost if $\alpha_b$ is non-equal gain (i.e., not phase only) because transmit power at one time (i.e., during a time the base station point is listening with one basis function beam) cannot be transferred to another time (i.e., during a time the base station is listening with a different basis function beam). 2) The base station does not know which basis function beams that the mobile station selected so the base station may typically need to sum all signals received on each basis function beam together. Hence not only is signal energy added together, so is the noise (albeit incoherently). 3) And, using highly-directional basis function beams means that only a few beams will be dominant at the mobile (e.g., $M_B \ll M^2$, perhaps as low as 2 or 3). Hence when the base station adds up the signals on the different RACH preambles, most will only contain noise and hence the noise will be enhanced.

For example, for a 4×4 array (i.e., M=4), the aggregated RACH signal at the base station may be given by:

$$y(n) = \sum_{u=1}^{N_u} \sum_{t=1}^{16} [\alpha_t^u v_t^T h_u x_u(n) + n_t(n)] \quad \text{(Eqn. 14)}$$

where $N_u$ is the number of mobiles sending RACH preambles at the same time, $\alpha_t^u$ is the phase value for basis function beam t for mobile u, $v_t$ is the $M^2 \times 1$ basis function beam used during RACH interval t, $h_u$ is the $M^2 \times 1$ channel from mobile u, $x_u(n)$ is the RACH preamble from mobile u, and $n_t(n)$ is additive noise with power of $\sigma^2$. The RACH preambles from the different users could be different spreading codes or different sequences (such as generalized chirp-like (GCL) sequences) that have good auto correlations and good cross correlations.

According to an example implementation, one example goal may be to generate or create an aggregated RACH signal which has a similar SNR (signal to noise ratio) to a signal received on an optimal receive beam, which, for a single-ray (or single beam) channel, may be given by:

$$SNR_{OPT} = \frac{M^2}{\sigma^2} = \frac{16}{\sigma^2} \quad \text{(Eqn. 15)}$$

Assuming a single user is sending the RACH preamble (i.e., $N_u=1$) and that $E[|x(n)|2]=1$, the SNR for the aggregated RACH signal may be given by:

$$SNR = \frac{\left|\sum_{t=1}^{16} \alpha_t v_t^T h_1\right|^2}{16\sigma^2} \quad \text{(Eqn. 16)}$$

In an illustrative example implementation, the mobile station, e.g., when sending the feedback signals, may have a maximum transmit power of 1. Hence to get the highest SNR, $\alpha_t$ needs to have unit power (i.e., $\alpha_t = \exp(j*\beta_t)$), and the number of dominant basis function beams, $M_B$, needs to be equal to $M^2$ (16 in this case) so that there are no zero-valued phase values. With highly-directional beams this criteria will not be met since there will only be a few (e.g., 2-3) dominant beams, and hence a significant SNR loss will occur. With near-omni-directional basis function beams, at any given mobile location, each beam will have very similar receive power and hence most or all basis functions will be important and the power received on each beam will be roughly equal. In other words for near-omni-directional beams, $|v_t^T h_u|^2 \approx 1$ for all t and hence the aggregated RACH signal will approach the optimal SNR of $M^2/\sigma^2$ ($16/\sigma^2$ in the example). Therefore, for these reasons, by way of example, it may be advantageous for a mobile station to send feedback for RACH preamble to the base station via omni-directional (or near-omni directional) basis function beams.

Figure 3:
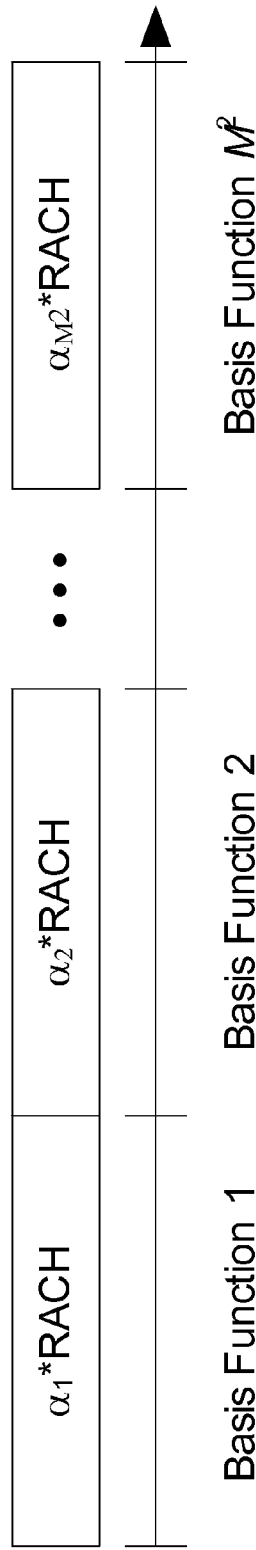
FIG. 3 is a diagram illustrating a transmission of weighted RACH preambles for multiple basis function beams according to an example implementation.

According to an example implementation, a base station/access point may listen (e.g., detect signals) on each basis function beam at a different time, and the mobile station sends its RACH preamble at the times associated with the dominant $M_B$ basis function beams. In addition, during each time (e.g., beam transmission time) the base station listens (or receives signals) with beam b, and the mobile station will transmit the RACH preamble waveform multiplied (or weighted) by the translated basis-function weighting (e.g., phase or gain and phase) associated with that beam b. FIG. 3 is a diagram illustrating a transmission of weighted RACH preambles for multiple basis function beams according to an example implementation. According to an example implementation, the mobile station may multiply or weight the RACH preamble by the translated basis-function weighting, $\alpha_b^*$ (gain and phase values), as is shown in FIG. 3. The base station/access point may sum up the contributions (received weighted signals) from all beams and then coherently combine the multiple weighted RACH preambles sent for all the beams for the second set of basis function beams, according to one illustrative example implementation.

As noted above, according to an illustrative example implementation, the pilot sequences may be sent from or via the same basis function beams that are also used to listen to or receive the RACH preambles, e.g., the same set of basis function beams may be used to send sounding signals to the mobile station and to receive feedback from the mobile station. However, as noted above, it may be advantageous to use near omni-directional basis function beams at the base station for receiving the RACH preambles sent by the mobile station to the base station. If the same set of basis function beams were used for sending sounding signals and receiving the RACH preambles, then the use of near-omni-directional beams on the pilot sequences/sounding signals sent by the base station may mean that any potential gain of beamforming obtained with directional beams is lost when using near-omni-directional beams by the base station to transmit sounding signals to the mobile station. The beamforming loss may be compensated for by using longer pilot sequences, however longer pilot sequences makes the training less efficient since more time is required to send the pilot sequences/sounding signals.

As a result, it may be advantageous to obtain the beamforming gain of highly-directional basis function beams for the base station to transmit sounding signals/pilot sequences to the mobile station, while using near-omni-directional basis function beams when the mobile station is transmitting, and when the base station is receiving or listening to the RACH preamble. According to an example implementation, this process (of using a first set of basis function beams to send sounding signals from a base station to the mobile station, and a second set of basis function beams to send feedback to the base station) is possible if the mobile station transforms the information (e.g., measured basis-function weights or weightings, such as gain/phase values) received by the mobile station from sounding signals or pilot sequences sent using the highly-directional beams into information (e.g., translated basis-function weightings or weights, such as gain and phase values) for the near-omni-directional beams.

Figure 4:
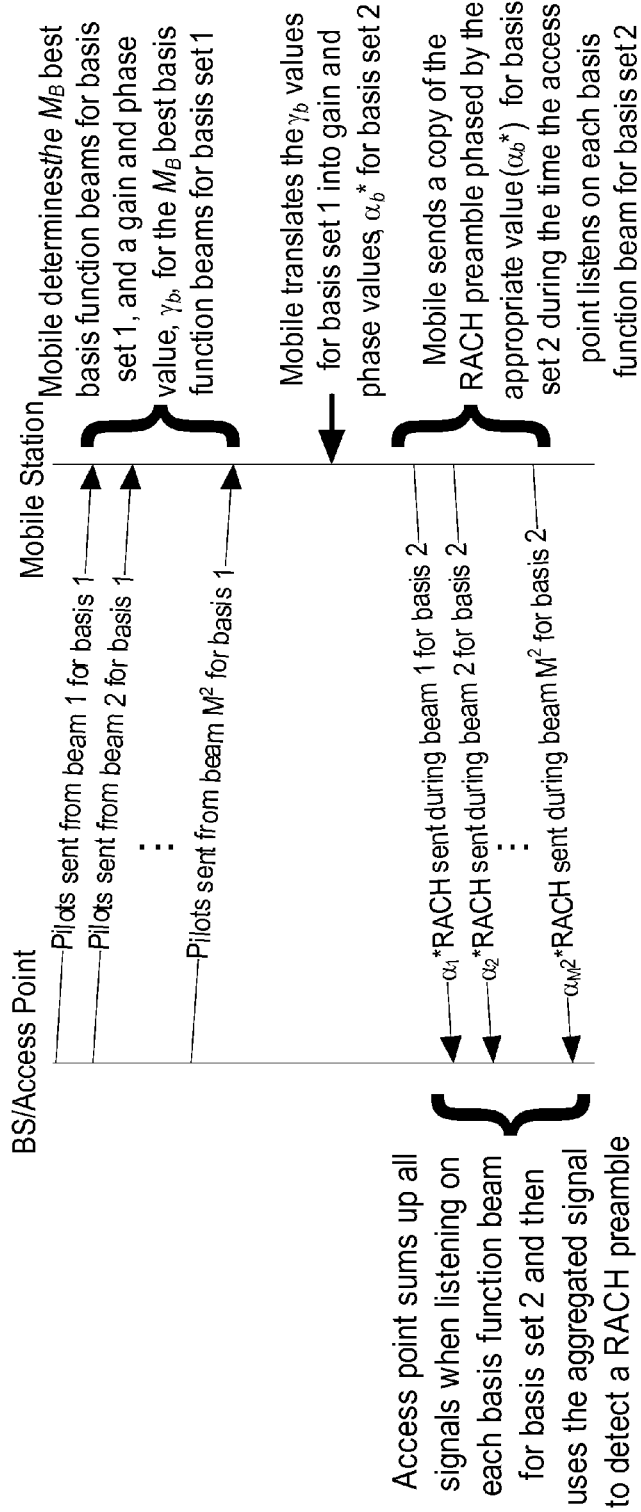
FIG. 4 is a diagram illustrating a RACH (random access) procedure with basis function beams when a mobile station translates basis-function weightings from one basis function set to another basis function set.

FIG. 4 is a diagram illustrating a RACH (random access) procedure with basis function beams when a mobile station translates basis-function weightings from one basis function set to another basis function set. Techniques described herein allow sounding, e.g., a pilot sequence, to be sent via a first set of basis function beams, while information (e.g., translated basis-function weightings ($\alpha_b$ or $\alpha_b^*$), such as gain and phase values plus an indication of $N_B$ beams of the second set of basis function beams) to be sent via a second set of basis function beams. One illustrative example case, which is illustrated in FIG. 4, may be when a base station sends sounding signals (e.g., pilot sequences) via a first set of narrow-beam basis function beams (set 1 of basis function beams), while a mobile station sends a weighted RACH preamble (weighted with translated basis-function weightings $\alpha_b^*$) when the base station listens on a second set of near omni-directional basis function beams (set 2 of basis function beams). In this case the base station/access point listens or receives signals with a set of near-omni-directional basis function beams, e.g., in order to receive the RACH signals in an omni-direction fashion while the base station/access point sends sounding signals via a narrow basis function beams. For example, to receive the RACH preamble or feedback signals via the second set of basis function beams, the base station may apply to its antennas the beam weightings ($v_b^2$) for the beams of the second set of basis function beams, while the mobile station may transmit the RACH preamble or feedback signals via the weighted beams of the second set of basis function beams, e.g., where the mobile station may apply the translated basis-function weightings ($\alpha_b^*$) to the respective $N_B$ basis function beams of a second set of basis function beams with which the base station listens to transmit the feedback or RACH preamble.

Therefore, as shown in FIG. 4, the base station/access point sends pilots (pilot sequences) via each beam for the first set of basis function beams (basis 1). The mobile station determines the $M_B$ best basis function beams for the first set (or set 1) of basis function beams and the basis-function weightings ($\gamma_b$) of the $M_B$ basis function beams of the received first set of basis function beams. For example, the $M_B$ best basis function beams may be those beams of the first set (or set 1) of basis function beams having a power of the beam that is greater than a threshold power value. The mobile station may then translate the basis-function weightings $\gamma_b$ (measured basis-function weightings, or measured gain phase values), as measured by the mobile station for beam b of the first set of basis function beams to translated basis-function weightings $\alpha_b^*$ (e.g., including gain and phase values) for a second set of basis function beams, e.g., according to Eqns. 8 and 9 above, for example. The mobile station may then send feedback signals, such as a weighted (or phased) RACH preamble (e.g., the RACH preamble multiplied by the translated basis-function weightings $\alpha_b^*$) for the second set of basis functions (basis function beam set 2). The base station/access point may listen or receive the transmitted feedback signals or weighted RACH preambles during each basis function beam for the second set (or set 2) of basis function beams, and sums or aggregates these weighted feedback signals or weighted RACH preambles, e.g., sent via the $N_B$ beams of the second set of basis function beams, for example, and may use the aggregated feedback signal or aggregated RACH preamble to detect the feedback signal or RACH preamble from the mobile station.

According to an example implementation, the mobile station may translate the gain and phase values $\gamma_b$ determined with the narrow-beam basis function beams into translated gain and phase values $\alpha_b^*$ for the near-omni-directional basis function beams where the translated gain and phase values $\alpha_b^*$ may be applied to the RACH preamble which is received at the base station/access point at a particular time on a particular near-omni-directional basis function beam.

A number of example advantages may be obtained via one or more of the example implementations. Some illustrative example advantages may include sounding one set of basis function beams from the base station/access point, but having the mobile station select a second set of basis function beams for sending feedback to the base station. For example, a narrow-beam or directional beam first set of basis function beams may be used for sounding from the base station, while an omni-directional or near omni-directional second set of basis function beams may be used to send feedback (such, as, e.g., a RACH preamble) from the mobile station to the base station. For example, one such approach may result in improved performance for the same amount of feedback needed for the first set or for reduced feedback with the same performance. For example if there are $N_s$=16 sets of basis function beams for a 4×4 array at the base station/access point, feeding back a single best beam and a 4 bit beam set indication that identifies the best basis function beam set may provide nearly similar performance as sending back the 4 best beams plus associated gain and phase values for one of the sets of basis function beams (narrow-beam basis function beams are assumed), according to one example implementation.

Also, another advantage is being able to obtain feedback via near-omni-directional basis function beams based on a sounding sent with narrow-beam basis function beams. The narrow-beam sounding has the advantage of obtaining a large beamforming gain and hence requires shorter pilot sequences than would be needed when sounding near-omni-directional basis function beams. However, there are times when the mobile station may need gain and phase information for near-omni-directional basis functions, for example with RACH preamble transmission. Thus, one or more example implementations, which may use a first basis function to sound and a second basis function to send feedback signals, may allow narrow-beam basis function beams for sounding and an omni-directional or near omni-directional beams for sending feedback signals to the base station.

An additional advantage of one or more example implementations may be, for example, reducing feedback if sounding is done with near-omni-directional basis function beams. For example, there may be reasons where a base station/access point would want to transmit pilots/sounding signals with near-omni-directional basis function beams instead of using directional basis function beams. For example, the synchronization channel or the broadcast control signals (via broadcast control channel) may be sent via an omni-directional set of basis function beams. In this case a mobile station may listen or receive the pilots/sounding signals sent with the near-omni-directional basis function beams and then determine a gain and phase for each of the basis function beams (e.g., all $M^2$ beams in the example above). Since near-omni-directional beams are used, there are no dominant beams, and hence the mobile would need to feed back a gain and phase value for all $M^2$ basis function beams. As an alternative, the mobile station may use one or more example implementations to determine the gain and phase value for the $M_B$ best basis function beams in a set of narrow-beam basis function beams. Typically $M_B$ can be small which would mean a dramatic decrease in the amount of feedback needed (e.g., 2 or 3 gain and phase values plus beam selections versus $M^2$ gain and phase values).

Figure 5:
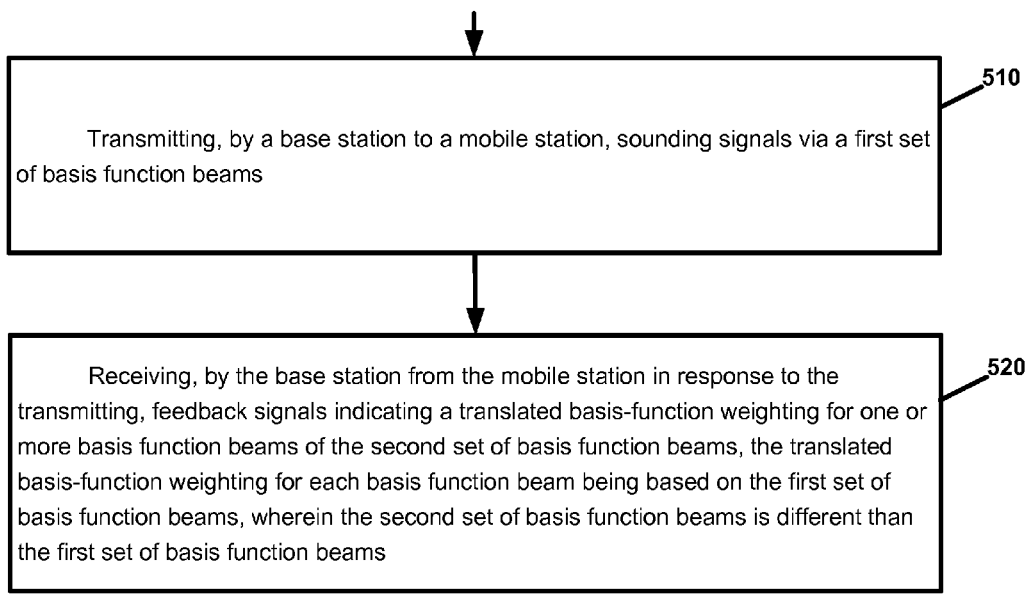
FIG. 5 is a flow chart illustrating operation of a base station according to an example implementation.

FIG. 5 is a flow chart illustrating operation of a base station according to an example implementation. Operation 510 includes transmitting, by a base station to a mobile station, sounding signals via a first set of basis function beams. And, operation 520 includes receiving, by the base station from the mobile station in response to the transmitting, feedback signals indicating a translated basis-function weighting for one or more basis function beams of the second set of basis function beams, the translated basis-function weighting for one or more basis function beams being based on the first set of basis function beams, wherein the second set of basis function beams is different than the first set of basis function beams.

According to an example implementation of the method of FIG. 5, the receiving may further include receiving, by the base station from the mobile station signals indicating or identifying the second set of basis function beams.

According to an example implementation of the method of FIG. 5, the base station may include Q antennas, wherein the transmitting sounding signals via a first set of basis function beams comprises transmitting a pilot sequence from each of the Q antennas for each beam of the first set of basis function beams, an individual gain and phase value being applied to each of the Q antennas for each beam of the first set of basis function beams.

According to an example implementation of the method of FIG. 5, the transmitting may include transmitting: sounding signals via a first set of basis function beams, each of the basis function beams of the first set of basis function beams being transmitted by applying, by the base station, an individual gain and phase value applied to each of Q antennas; and a basis function beam set indicator that indicates the first set of basis function beams.

According to an example implementation of the method of FIG. 5, the transmitting sounding signals may include transmitting, by the base station to the mobile station, a pilot sequence via each beam of the first set of basis function beams.

According to an example implementation of the method of FIG. 5, receiving the feedback signals may include: receiving an indication of $N_B$ beams of the second set of basis function beams; and receiving on the $N_B$ beams of the second set of basis function beams feedback signals which the mobile station has applied a translated basis-function weighting including a gain and phase value corresponding to each of the respective $N_B$ beams of the second set of basis function beams which the base station is receiving on, the translated basis-function weightings for the beams of the second set of basis function beams being a function of the first set of basis function beams.

According to an example implementation of the method of FIG. 5, the first set of basis function beams may include a set of narrow-beam set of basis function beams, and the second set of basis function beams comprises an omni-directional or near omni-directional set of basis function beams.

According to another example implementation, an apparatus may include at least one processor and at least one memory including computer instructions, when executed by the at least one processor, cause the apparatus to: transmit, by a base station to a mobile station, sounding signals via a first set of basis function beams; and receive, by the base station from the mobile station in response to the transmitting, feedback signals indicating a translated basis-function weighting for each basis function beam of the second set of basis function beams, the translated basis-function weighting for each basis function beam being based on the first set of basis function beams, wherein the second set of basis function beams is different than the first set of basis function beams.

According to an example implementation, the instructions causing the apparatus to receive the feedback signals may include instructions causing the apparatus to: receive an indication of $N_B$ beams of the second set of basis function beams; and receiving on the $N_B$ beams of the second set of basis function beams feedback signals which the mobile station has applied a translated basis-function weighting including a gain and phase value corresponding to each of the respective $N_B$ beams of the second set of basis function beams which the base station is receiving on, the translated basis-function weightings for the beams of the second set of basis function beams being a function of the first set of basis function beams.

According to an example implementation, the first set of basis function beams may include a set of narrow-beam set of basis function beams, and the second set of basis function beams comprises an omni-directional or near omni-directional set of basis function beams.

According to another example implementation, a computer program product may include a computer-readable storage medium and storing executable code that, when executed by at least one data processing apparatus, is configured to cause the at least one data processing apparatus to perform a method including: transmitting, by a base station to a mobile station, sounding signals via a first set of basis function beams; and receiving, by the base station from the mobile station in response to the transmitting, feedback signals indicating a translated basis-function weighting for one or more basis function beams of the second set of basis function beams, the translated basis-function weighting for one or more basis function beams being based on the first set of basis function beams, wherein the second set of basis function beams is different than the first set of basis function beams.

According to an example implementation, an apparatus includes means (704 and/or 702A/702B) for transmitting, by a base station to a mobile station, sounding signals via a first set of basis function beams, and means (704 and/or 702A/702B) for receiving, by the base station from the mobile station in response to the transmitting, feedback signals indicating a translated basis-function weighting for one or more basis function beams of the second set of basis function beams, the translated basis-function weighting for one or more basis function beams being based on the first set of basis function beams, wherein the second set of basis function beams is different than the first set of basis function beams.

According to an example implementation, the means for receiving may further include means (704 and/or 702A/702B) for receiving, by the base station from the mobile station signals indicating or identifying the second set of basis function beams.

According to an example implementation, the means for transmitting may include means (704 and/or 702A/702B) for transmitting: sounding signals via a first set of basis function beams, each of the basis function beams of the first set of basis function beams being transmitted by applying, by the base station, an individual gain and phase value applied to each of Q antennas; and a basis function beam set indicator that indicates the first set of basis function beams.

According to an example implementation, the means for transmitting sounding signals may include means (704 and/or 702A/702B) for transmitting, by the base station to the mobile station, a pilot sequence via each beam of the first set of basis function beams.

According to an example implementation, the means for receiving the feedback signals may include means (704 and/or 702A/702B) for: receiving an indication of $N_B$ beams of the second set of basis function beams; and receiving on the $N_B$ beams of the second set of basis function beams feedback signals which the mobile station has applied a translated basis-function weighting including a gain and phase value corresponding to each of the respective $N_B$ beams of the second set of basis function beams which the base station is receiving on, the translated basis-function weightings for the beams of the second set of basis function beams being a function of the first set of basis function beams.

Figure 6:
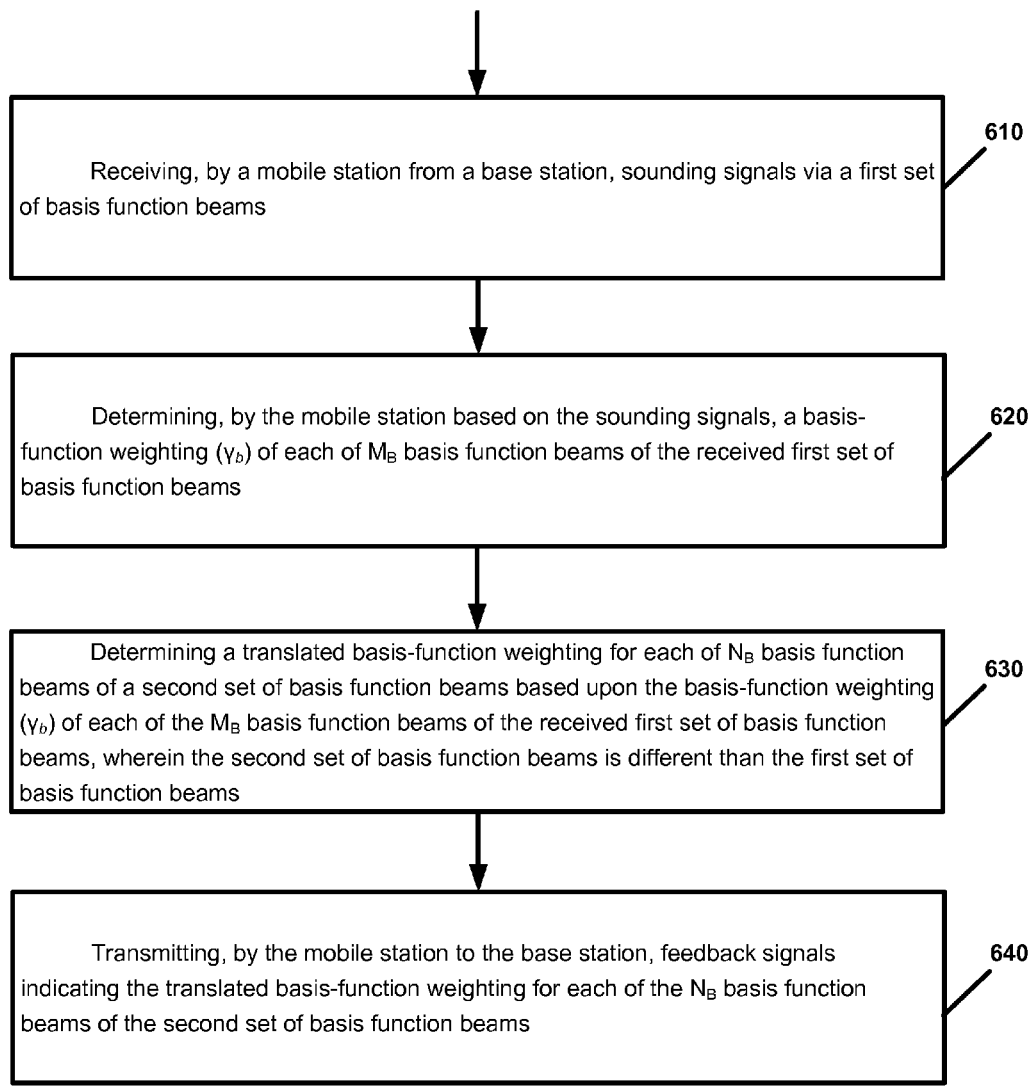
FIG. 6 is a flow chart illustrating operation of a mobile station according to an example implementation.

FIG. 6 is a flow chart illustrating operation of a mobile station according to an example implementation. Operation 610 includes receiving, by a mobile station from a base station, sounding signals via a first set of basis function beams. Operation 620 includes determining, by the mobile station based on the sounding signals, a basis-function weighting ($\gamma_b$) of each of $M_B$ basis function beams of the received first set of basis function beams. Operation 630 includes determining a translated basis-function weighting for each of $N_B$ basis function beams of a second set of basis function beams based upon the basis-function weighting ($\gamma_b$) of each of the $M_B$ basis function beams of the received first set of basis function beams, wherein the second set of basis function beams is different than the first set of basis function beams. And, operation 640 includes transmitting, by the mobile station to the base station, feedback signals indicating the translated basis-function weighting for each of the $N_B$ basis function beams of the second set of basis function beams.

Note that $M_B$ could be the total number of beams in the first set of basis function beams or could be more or less than the total number of beams in the first set of basis function beams. Similarly, $N_B$ could be the total number of beams in the second set of basis function beams or could be more or less than the total number of beams in the second set of basis function beams.

According to an example implementation of the method of FIG. 6, the transmitting feedback signals may include: transmitting an indication of the $N_B$ beams of the second set of basis function beams, and transmitting the feedback signals weighted by a gain and phase value corresponding to each of the translated basis-function weightings for the $N_B$ beams of the second set of basis function beams, wherein the transmitting the feedback signals is performed at a time when the base station is receiving on each of the respective $N_B$ beams of the second set of basis function beams in which the mobile station has applied the respective translated basis-function weighting.

According to an example implementation of the method of FIG. 6, the receiving sounding signals may include receiving a pilot sequence via each beam of the first set of basis function beams.

According to an example implementation of the method of FIG. 6, the first set of basis function beams may include a set of narrow-beam set of basis function beams, and the second set of basis function beams may include an omni-directional or near omni-directional set of basis function beams.

According to an example implementation of the method of FIG. 6, the determining a translated basis-function weighting for each of $N_B$ basis function beams of a second set of basis function beams may include: determining beam weightings ($v_b^1$) applied to antennas at the base station to transmit the sounding signals via the first set of basis function beams; determining a channel estimate ($w_{opt}$) between the base station and the mobile station based on the beam weightings ($v_b^1$) applied to antennas at the base station to transmit the sounding signals via the first set of basis function beams and the determined basis-function weightings ($\gamma_b$) of the $M_B$ basis function beams of the received first set of basis function beams; determining beam weightings ($v_b^2$) for the beams of the second set of basis function beams; and determining a translated basis-function weighting ($\alpha_b^*$) for each of $N_B$ basis function beams of a second set of basis function beams based on the beam weightings ($v_b^2$) for the beams of the second set of basis function beams and the channel estimate ($w_{opt}$) between the base station and the mobile station.

According to another example implementation, an apparatus may include at least one processor and at least one memory including computer instructions, when executed by the at least one processor, cause the apparatus to: receive, by a mobile station from a base station, sounding signals via a first set of basis function beams; determine, by the mobile station based on the sounding signals, a basis-function weighting ($\gamma_b$) of each of $M_B$ basis function beams of the received first set of basis function beams; determine a translated basis-function weighting for each of $N_B$ basis function beams of a second set of basis function beams based upon the basis-function weighting of each of the $M_B$ basis function beams of the received first set of basis function beams, wherein the second set of basis function beams is different than the first set of basis function beams; and transmit, by the mobile station to the base station, feedback signals indicating the translated basis-function weighting for each of the $N_B$ basis function beams of the second set of basis function beams.

According to an example implementation, the instructions causing the apparatus to transmit feedback signals may include instructions causing the apparatus to: transmit an indication of the $N_B$ beams of the second set of basis function beams; and transmit the feedback signals weighted by a gain and phase value corresponding to each of the translated basis-function weightings for the $N_B$ beams of the second set of basis function beams, wherein the transmitting the feedback signals is performed at a time when the base station is receiving on each of the respective $N_B$ beams of the second set of basis function beams in which the mobile station has applied the respective translated weighting.

According to an example implementation, the instructions causing the apparatus to determine a translated basis-function weighting for each of $N_B$ basis function beams of a second set of basis function beams may include instructions causing the apparatus to: determine beam weightings ($v_b^1$) applied to antennas at the base station to transmit the sounding signals via the first set of basis function beams; determine a channel estimate ($w_{opt}$) between the base station and the mobile station based on the beam weightings ($v_b^1$) applied to antennas at the base station to transmit the sounding signals via the first set of basis function beams and the determined basis-function weightings ($\gamma_b$) of the $M_B$ basis function beams of the received first set of basis function beams; determine beam weightings ($v_b^2$) for the beams of the second set of basis function beams; and determine a translated basis-function weighting ($\alpha_b$) for each of $N_B$ basis function beams of a second set of basis function beams based on the beam weightings ($v_b^2$) for the beams of the second set of basis function beams and the channel estimate ($w_{opt}$) between the base station and the mobile station.

Note that the mobile may determine the beam weightings ($v_b^1$) for the beams of the first set of basis function beams through a table look up (e.g., access memory locations containing these values) to get the gain and phase values which make up these beam weightings. Similarly for beam weightings ($v_b^2$) for the beams of the second set of basis function beams, the mobile may determine these beam weightings through a table look (e.g., access memory locations containing these values) up to get the gain and phase values which make up these beam weightings.

According to an example implementation, a computer program product may include a computer-readable storage medium and storing executable code that, when executed by at least one data processing apparatus, is configured to cause the at least one data processing apparatus to perform a method including: receive, by a mobile station from a base station, sounding signals via a first set of basis function beams; determine, by the mobile station based on the sounding signals, a basis-function weighting ($\gamma_b$) of each of $M_B$ basis function beams of the received first set of basis function beams; determine a translated basis-function weighting for each of $N_B$ basis function beams of a second set of basis function beams based upon the basis-function weighting of each of the $M_B$ basis function beams of the received first set of basis function beams, wherein the second set of basis function beams is different than the first set of basis function beams; and transmit, by the mobile station to the base station, feedback signals indicating the translated basis-function weighting for each of the $N_B$ basis function beams of the second set of basis function beams.

According to an example implementation, an apparatus may include means (704 and/or 702A/702B) for receiving, by a mobile station from a base station, sounding signals via a first set of basis function beams, means (704 and/or 702A/702B) for determining, by the mobile station based on the sounding signals, a basis-function weighting ($\gamma_b$) of each of $M_B$ basis function beams of the received first set of basis function beams, means (704 and/or 702A/702B) for determining a translated basis-function weighting for each of $N_B$ basis function beams of a second set of basis function beams based upon the basis-function weighting ($\gamma_b$) of each of the $M_B$ basis function beams of the received first set of basis function beams, wherein the second set of basis function beams is different than the first set of basis function beams, and means (704 and/or 702A/702B) for transmitting, by the mobile station to the base station, feedback signals indicating the translated basis-function weighting for each of the $N_B$ basis function beams of the second set of basis function beams.

Note that $M_B$ could be the total number of beams in the first set of basis function beams or could be more or less than the total number of beams in the first set of basis function beams. Similarly, $N_B$ could be the total number of beams in the second set of basis function beams or could be more or less than the total number of beams in the second set of basis function beams.

According to an example implementation of the apparatus, the means for transmitting feedback signals may include means (704 and/or 702A/702B) for: transmitting an indication of the $N_B$ beams of the second set of basis function beams, and transmitting the feedback signals weighted by a gain and phase value corresponding to each of the translated basis-function weightings for the $N_B$ beams of the second set of basis function beams, wherein the transmitting the feedback signals is performed at a time when the base station is receiving on each of the respective $N_B$ beams of the second set of basis function beams in which the mobile station has applied the respective translated basis-function weighting.

According to an example implementation of the apparatus, the mans for receiving sounding signals may include means (704 and/or 702A/702B) for receiving a pilot sequence via each beam of the first set of basis function beams.

According to an example implementation of the apparatus, the first set of basis function beams may include a set of narrow-beam set of basis function beams, and the second set of basis function beams may include an omni-directional or near omni-directional set of basis function beams.

According to an example implementation of the apparatus, the means for determining a translated basis-function weighting for each of $N_B$ basis function beams of a second set of basis function beams may include: means (704 and/or 702A/702B) for determining beam weightings ($v_b^1$) applied to antennas at the base station to transmit the sounding signals via the first set of basis function beams; means (704 and/or 702A/702B) for determining a channel estimate ($w_{opt}$) between the base station and the mobile station based on the beam weightings ($v_b^1$) applied to antennas at the base station to transmit the sounding signals via the first set of basis function beams and the determined basis-function weightings ($\gamma_b$) of the $M_B$ basis function beams of the received first set of basis function beams; means (704 and/or 702A/702B) for determining beam weightings ($v_b^2$) for the beams of the second set of basis function beams; and means (704 and/or 702A/702B) for determining a translated basis-function weighting ($\alpha_b^*$) for each of $N_B$ basis function beams of a second set of basis function beams based on the beam weightings ($v_b^2$) for the beams of the second set of basis function beams and the channel estimate ($w_{opt}$) between the base station and the mobile station.

Figure 7:
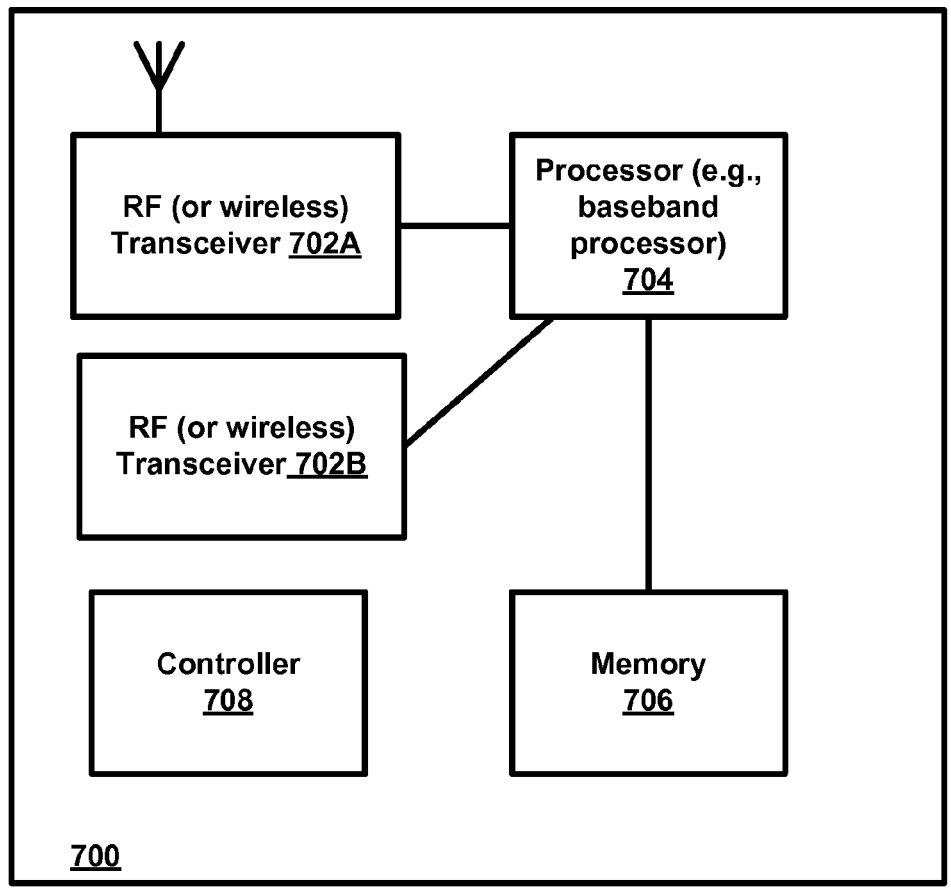
FIG. 7 is a block diagram of a wireless station (e.g., base station or mobile station) according to an example implementation.

FIG. 7 is a block diagram of a wireless station (e.g., BS or user device) 700 according to an example implementation. The wireless station 700 may include, for example, two RF (radio frequency) or wireless transceivers 702A, 702B, where each wireless transceiver includes a transmitter to transmit signals and a receiver to receive signals. The wireless station also includes a processor or control unit/entity (controller) 704 to execute instructions or software and control transmission and receptions of signals, and a memory 706 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software.

In addition, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, ...) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
transmitting, by a base station to a mobile station, sounding signals via a first set of basis function beams; and
receiving, by the base station from the mobile station in response to the transmitting, feedback signals indicating a translated basis-function weighting for one or more basis function beams of a second set of basis function beams, the translated basis-function weighting for one or more basis function beams being based on the first set of basis function beams, wherein the second set of basis function beams is different than the first set of basis function beams;
wherein the base station includes Q antennas, wherein the transmitting sounding signals via a first set of basis function beams comprises transmitting a pilot sequence from each of the Q antennas for each beam of the first set of basis function beams, an individual gain and phase value being applied to each of the Q antennas for each beam of the first set of basis function beams.

2. The method of claim 1 wherein the receiving further comprises receiving, by the base station from the mobile station, signals indicating or identifying the second set of basis function beams.

3. A method comprising:
transmitting, by a base station to a mobile station, sounding signals via a first set of basis function beams; and
receiving, by the base station from the mobile station in response to the transmitting, feedback signals indicating a translated basis-function weighting for one or more basis function beams of a second set of basis function beams, the translated basis-function weighting for one or more basis function beams being based on the first set of basis function beams, wherein the second set of basis function beams is different than the first set of basis function beams;
wherein the transmitting comprises transmitting:
sounding signals via a first set of basis function beams, each of the basis function beams of the first set of basis function beams being transmitted by applying, by the base station, an individual gain and phase value applied to each of Q antennas; and
a basis function beam set indicator that indicates the first set of basis function beams.

4. A method comprising:
transmitting, by a base station to a mobile station, sounding signals via a first set of basis function beams; and
receiving, by the base station from the mobile station in response to the transmitting, feedback signals indicating a translated basis-function weighting for one or more basis function beams of a second set of basis function beams, the translated basis-function weighting for one or more basis function beams being based on the first set of basis function beams, wherein the second set of basis function beams is different than the first set of basis function beams;
wherein receiving the feedback signals comprises:
receiving an indication of $N_B$ beams of the second set of basis function beams; and
receiving on the $N_B$ beams of the second set of basis function beams feedback signals which the mobile station has applied a translated basis-function weighting including a gain and phase value corresponding to each of the respective $N_B$ beams of the second set of basis function beams which the base station is receiving on, the translated basis-function weightings for the beams of the second set of basis function beams being a function of the first set of basis function beams.

5. The method of claim 4 wherein the transmitting sounding signals comprises transmitting, by the base station to the mobile station, a pilot sequence via each beam of the first set of basis function beams.

6. A method comprising:
transmitting, by a base station to a mobile station, sounding signals via a first set of basis function beams; and
receiving, by the base station from the mobile station in response to the transmitting, feedback signals indicating a translated basis-function weighting for one or more basis function beams of a second set of basis function beams, the translated basis-function weighting for one or more basis function beams being based on the first set of basis function beams, wherein the second set of basis function beams is different than the first set of basis function beams; and
wherein the first set of basis function beams comprises a set of narrow-beam set of basis function beams, and the second set of basis function beams comprises an omni-directional or near omni-directional set of basis function beams.

7. An apparatus comprising at least one processor and at least one memory including computer instructions, when executed by the at least one processor, cause the apparatus to:
transmit, by a base station to a mobile station, sounding signals via a first set of basis function beams; and
receive, by the base station from the mobile station in response to the transmitting, feedback signals indicating a translated basis-function weighting for one or more basis function beams of a second set of basis function beams, the translated basis-function weighting for one or more basis function beams being based on the first set of basis function beams, wherein the second set of basis function beams is different than the first set of basis function beams;
wherein instructions causing the apparatus to receive the feedback signals comprises instructions causing the apparatus to:
receive an indication of NB beams of the second set of basis function beams; and
receiving on the NB beams of the second set of basis function beams feedback signals which the mobile station has applied a translated basis-function weighting including a gain and phase value corresponding to each of the respective NB beams of the second set of basis function beams which the base station is receiving on, the translated basis-function weightings for the beams of the second set of basis function beams being a function of the first set of basis function beams.

8. The apparatus of claim 7 wherein the first set of basis function beams comprises a set of narrow-beam set of basis function beams, and the second set of basis function beams comprises an omni-directional or near omni-directional set of basis function beams.

9. A method comprising:
receiving, by a mobile station from a base station, sounding signals via a first set of basis function beams;
determining, by the mobile station based on the sounding signals, a basis-function weighting ($\gamma_b$) of each of $M_B$ basis function beams of the received first set of basis function beams;
determining a translated basis-function weighting for each of $N_B$ basis function beams of a second set of basis function beams based upon the basis-function weighting ($\gamma_b$) of each of the $M_B$ basis function beams of the received first set of basis function beams, wherein the second set of basis function beams is different than the first set of basis function beams; and
transmitting, by the mobile station to the base station, feedback signals indicating the translated basis-function weighting for each of the $N_B$ basis function beams of the second set of basis function beams;
wherein the transmitting feedback signals comprises:
transmitting an indication of the NB beams of the second set of basis function beams; and
transmitting the feedback signals weighted by a gain and phase value corresponding to each of the translated basis-function weightings for the NB beams of the second set of basis function beams, wherein the transmitting the feedback signals is performed at a time when the base station is receiving on each of the respective NB beams of the second set of basis function beams in which the mobile station has applied the respective translated basis-function weighting.

10. The method of claim 9 wherein the receiving sounding signals comprises receiving a pilot sequence via each beam of the first set of basis function beams.

11. The method of claim 9 wherein the first set of basis function beams comprises a set of narrow-beam set of basis function beams, and the second set of basis function beams comprises an omni-directional or near omni-directional set of basis function beams.

12. The method of claim 9 wherein the determining a translated basis-function weighting for each of $N_B$ basis function beams of a second set of basis function beams comprises:
determining beam weightings ($v_b^1$) applied to antennas at the base station to transmit the sounding signals via the first set of basis function beams;
determining a channel estimate ($w_{opt}$) between the base station and the mobile station based on the beam weightings ($v_b^1$) applied to antennas at the base station to transmit the sounding signals via the first set of basis function beams and the determined basis-function weightings ($\gamma_b$) of the $M_B$ basis function beams of the received first set of basis function beams;
determining beam weightings ($v_b^2$) for the beams of the second set of basis function beams;
determining a translated basis-function weighting ($\alpha_b$) for each of $N_B$ basis function beams of a second set of basis function beams based on the beam weightings ($v_b^2$) for the beams of the second set of basis function beams and the channel estimate ($w_{opt}$) between the base station and the mobile station.

13. An apparatus comprising at least one processor and at least one memory including computer instructions, when executed by the at least one processor, cause the apparatus to:
receive, by a mobile station from a base station, sounding signals via a first set of basis function beams;
determine, by the mobile station based on the sounding signals, a basis-function weighting ($\gamma_b$) of each of $M_B$ basis function beams of the received first set of basis function beams;
determine a translated basis-function weighting for each of $N_B$ basis function beams of a second set of basis function beams based upon the basis-function weighting of each of the $M_B$ basis function beams of the received first set of basis function beams, wherein the second set of basis function beams is different than the first set of basis function beams; and
transmit, by the mobile station to the base station, feedback signals indicating the translated basis-function weighting for each of the $N_B$ basis function beams of the second set of basis function beams;
wherein the instructions causing the apparatus to transmit feedback signals comprises instructions causing the apparatus to:
transmit an indication of the NB beams of the second set of basis function beams; and
transmit the feedback signals weighted by a gain and phase value corresponding to each of the translated basis-function weightings for the NB beams of the second set of basis function beams, wherein the transmitting the feedback signals is performed at a time when the base station is receiving on each of the respective NB beams of the second set of basis function beams in which the mobile station has applied the respective translated weighting.

14. The apparatus of claim 13 wherein the instructions causing the apparatus to determining a translated basis-function weighting for each of $N_B$ basis function beams of a second set of basis function beams comprises instructions causing the apparatus to:
determine beam weightings ($v_b^1$) applied to antennas at the base station to transmit the sounding signals via the first set of basis function beams;
determine a channel estimate ($w_{opt}$) between the base station and the mobile station based on the beam weightings ($v_b^1$) applied to antennas at the base station to transmit the sounding signals via the first set of basis function beams and the determined basis-function weightings ($\gamma_b$) of the $M_B$ basis function beams of the received first set of basis function beams;
determine beam weightings ($v_b^2$) for the beams of the second set of basis function beams; and
determine a translated basis-function weighting ($\alpha_b$) for each of $N_B$ basis function beams of a second set of basis function beams based on the beam weightings ($v_b^2$) for the beams of the second set of basis function beams and the channel estimate ($w_{opt}$) between the base station and the mobile station.

* * * * *